(12) United States Patent
Saylor (10) Patent No.: US 11,656,025 B2
(45) Date of Patent: May 23, 2023

(54) RESILIENT HOUSING

(71) Applicant: WHIRLPOOL CORPORATION, Benton Harbor, MI (US)

(72) Inventor: Zachary J. Saylor, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 204 days.

(21) Appl. No.: 17/120,650

(22) Filed: Dec. 14, 2020

(65) Prior Publication Data

US 2021/0199375 A1  Jul. 1, 2021

Related U.S. Application Data

(60) Provisional application No. 62/954,849, filed on Dec. 30, 2019.

(51) Int. Cl.
*F25D 29/00* (2006.01)
*G03B 29/00* (2021.01)
*G03B 17/56* (2021.01)

(52) U.S. Cl.
CPC ......... *F25D 29/005* (2013.01); *G03B 17/561* (2013.01); *G03B 29/00* (2013.01); *F25D 2500/06* (2013.01); *F25D 2700/06* (2013.01)

(58) Field of Classification Search
None
See application file for complete search history.

(56) References Cited

U.S. PATENT DOCUMENTS

| | | | |
|---|---|---|---|
| 8,204,561 B2 * | 6/2012 | Mongan | H04B 1/3888 |
| | | | 455/575.8 |
| D791,757 S * | 7/2017 | Kim | D14/250 |
| D798,285 S * | 9/2017 | Kim | D14/250 |
| 9,969,450 B1 * | 5/2018 | Lu | B62J 45/10 |
| 10,030,806 B2 * | 7/2018 | Wen | F16M 13/022 |
| 10,112,765 B2 * | 10/2018 | Kim | A45C 11/00 |
| 10,244,210 B2 | 3/2019 | Izawa et al. | |
| 10,461,795 B2 * | 10/2019 | Guzek | H04M 1/0254 |
| 2006/0096303 A1 * | 5/2006 | Kavounas | F25D 29/00 |
| | | | 62/331 |
| 2011/0095033 A1 * | 4/2011 | Hung | H04B 1/3888 |
| | | | 220/602 |
| 2014/0028243 A1 * | 1/2014 | Rayner | H04N 5/2257 |
| | | | 320/108 |
| 2014/0035511 A1 * | 2/2014 | Ferber | H02J 7/0042 |
| | | | 320/103 |

(Continued)

FOREIGN PATENT DOCUMENTS

CN  203911533 U  10/2014
CN  206894737 U  1/2018

(Continued)

*Primary Examiner* — Rodney E Fuller
(74) *Attorney, Agent, or Firm* — Price Heneveld LLP (57) ABSTRACT

A resilient housing for a monitoring system includes a plurality of retention features, and a body that extends between the plurality of retention features and has a first end and a second end. The body includes a support surface that is defined between the plurality of retention features by elongated walls and end walls and a rear attachment surface. A resilient housing for a monitoring system further includes a coupling layer that is disposed on the rear attachment surface of the body.

19 Claims, 7 Drawing Sheets

(56) References Cited

U.S. PATENT DOCUMENTS

| | | | |
|---|---|---|---|
| 2014/0217862 A1* | 8/2014 | Rayner | H05K 5/0221 |
| | | | 312/223.1 |
| 2014/0263939 A1* | 9/2014 | Rinner | F16M 11/105 |
| | | | 248/688 |
| 2014/0378193 A1* | 12/2014 | Biancamano | H04B 1/3888 |
| | | | 455/575.8 |
| 2015/0070575 A1* | 3/2015 | Lee | G03B 17/14 |
| | | | 348/373 |
| 2015/0211783 A1* | 7/2015 | Marutani | F25D 23/02 |
| | | | 62/125 |
| 2016/0033194 A1* | 2/2016 | Sumihiro | F25D 23/04 |
| | | | 62/125 |
| 2016/0057394 A1 | 2/2016 | Marutani et al. | |
| 2018/0131794 A1* | 5/2018 | Holder | H04M 1/11 |
| 2018/0259242 A1 | 9/2018 | Sumihiro et al. | |
| 2020/0059546 A1* | 2/2020 | Wilder | H04M 1/185 |
| 2021/0218934 A1* | 7/2021 | Gorgees | H04N 5/2257 |

FOREIGN PATENT DOCUMENTS

| | | |
|---|---|---|
| DE | 102013216759 A1 | 2/2015 |
| JP | 2003207258 A | 7/2003 |

\* cited by examiner

RESILIENT HOUSING

CROSS-REFERENCE TO RELATED APPLICATION

This application claims the benefit under 35 U.S.C. § 119(e) to U.S. Provisional Patent Application No. 62/954,849, filed on Dec. 30, 2019, and entitled "RESILIENT HOUSING," which is incorporated herein by reference in its entirety.

BACKGROUND OF THE DISCLOSURE

The present disclosure generally relates to a housing for a data collection device, and more specifically, to a resilient housing for a data collection device.

SUMMARY OF THE DISCLOSURE

According to one aspect of the present disclosure, a monitoring system for an appliance includes a resilient housing that has a first end and a second end. The resilient housing includes retention features, and a body that has a rear attachment surface and a support surface. The body also includes first and second elongated walls and first and second end walls that cooperate to define the support surface. The resilient housing further includes a coupling layer that is disposed on the rear attachment surface of the body, and a data collection device that is disposed on the support surface of the body and is operably coupled to the resilient housing via the retention features.

According to another aspect of the present disclosure, a monitoring assembly for an appliance includes a resilient housing including a plurality of retention features and a body that extend between the plurality of retention features. The body has a rear attachment surface and a support surface that is defined between the plurality of retention features. A data collection device is disposed on the support surface of the body and is operably coupled to the body of the resilient housing via the plurality of retention features. A coupling layer is disposed on the rear attachment surface of the body.

According to yet another aspect of the present disclosure, a resilient housing for a monitoring system includes a plurality of retention features, and a body that has a first end and a second end and extends between the plurality of retention features. The body includes a support surface that is defined between the plurality of retention features by elongated walls and end walls and a rear attachment surface. A resilient housing for a monitoring system further includes a coupling layer that is disposed on the rear attachment surface of the body.

These and other features, advantages, and objects of the present disclosure will be further understood and appreciated by those skilled in the art by reference to the following specification, claims, and appended drawings.

The components in the figures are not necessarily to scale, emphasis instead being placed upon illustrating the principles described herein.

DETAILED DESCRIPTION

The present illustrated embodiments reside primarily in combinations of apparatus components related to a resilient housing for a camera. Accordingly, the apparatus components have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

Figure 1:
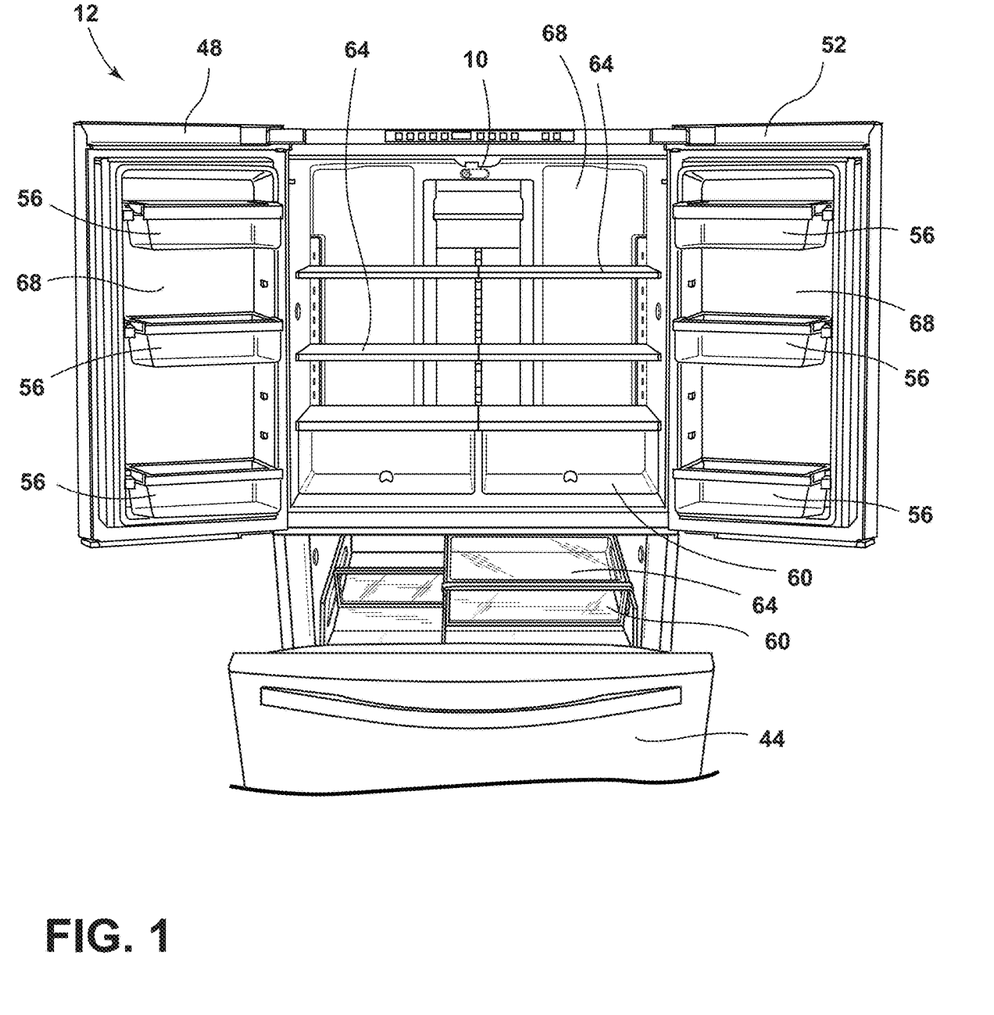
FIG. 1 is a front elevational view of an appliance of the present disclosure.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-9, reference numeral 10 generally designates a monitoring system for an appliance 12 that includes a resilient housing 14 having a first end 16 and a second end 18. The resilient housing 14 includes retention features 20 and a body 22 that has a rear attachment surface 24 and a support surface 26. The body 22 also includes first and second elongated walls 28, 30 and first and second end walls 32, 34 that cooperate to define the support surface 26. A coupling layer 36 is disposed on the rear attachment surface 24 of the body 22, and a data collection device 38 is disposed on the support surface 26 of the body 22. The data collection device 38 is operably coupled to the resilient housing 14 via the retention features 20.

Figure 2:
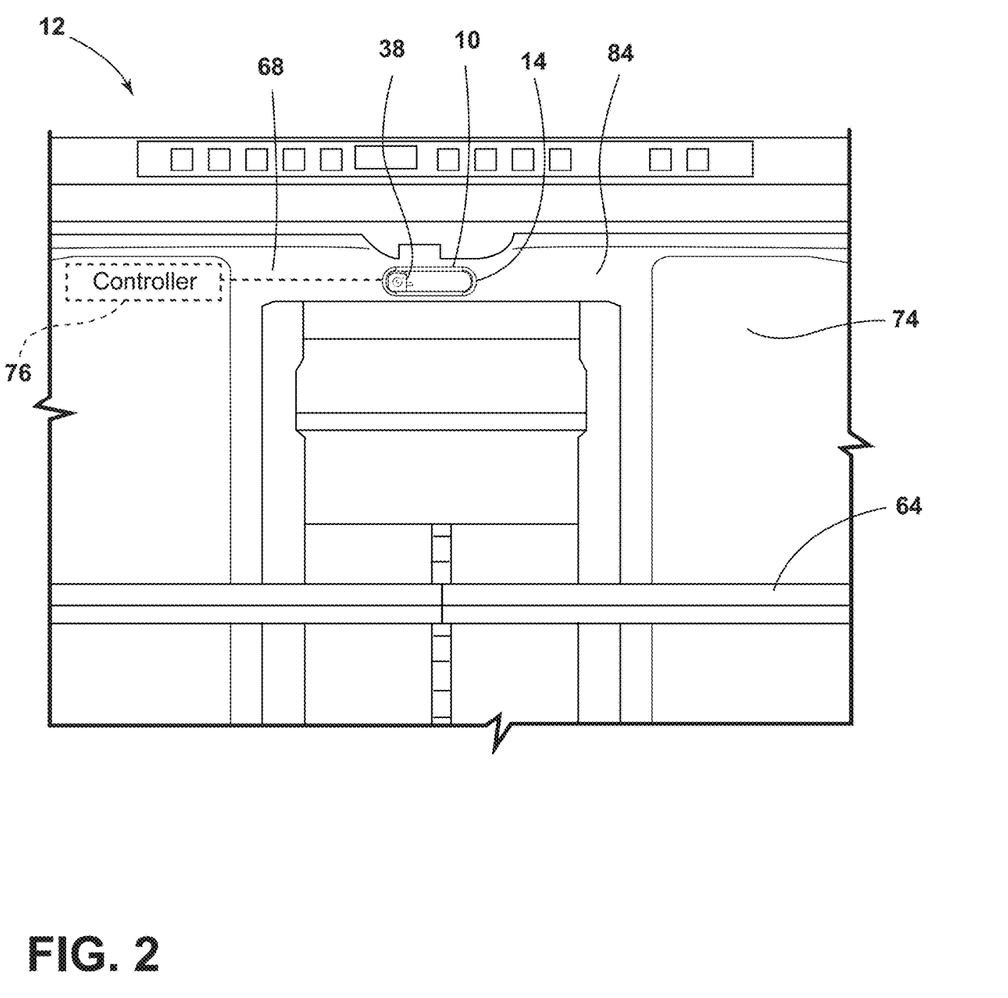
FIG. 2 is an enlarged partial front elevational view of the appliance of FIG. 1 with a monitoring system of the present disclosure.
Figure 3:
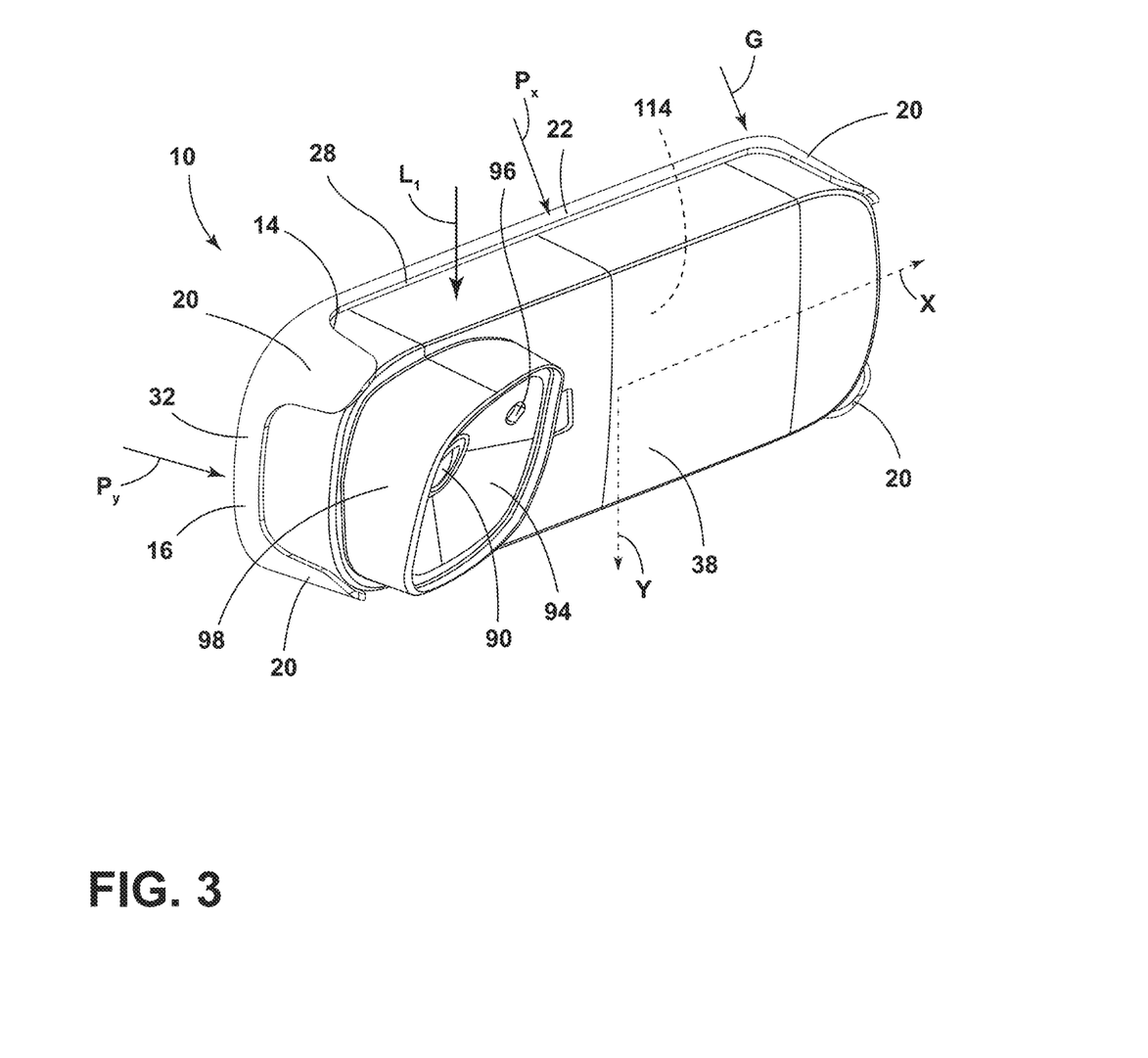
FIG. 3 is a front top perspective view of a monitoring system with a resilient housing and an imager of the present disclosure.

Referring to FIGS. 1-3, the resilient housing 14 is illustrated within the appliance 12. The appliance 12 is illustrated as a French-door style refrigerator with a bottom-mounted drawer 44 and first and second doors 48, 52. However, it is also contemplated that the resilient housing 14 may be used in other appliances, as well as other cabinetry, pantries, and similar storage compartments. Storage bins 56, drawers 60, and shelves 64 may be coupled to an interior surface 68 of the appliance 12, and each is configured to support and store consumer items typically stored in the appliance 12.

In a conventional refrigerator, a user may repeatedly open and close the doors 48, 52 to gauge the need to replenish items stored within the conventional refrigerator. For example, the consumer may repeatedly check the contents of the conventional refrigerator for purposes of assembling a grocery list or determine ingredients needed for a recipe.

It is advantageous to have a monitoring system 10 coupled to the interior surface 68 of the appliance 12 to internally monitor the contents within the appliance 12. The resilient housing 14 provides flexible removal of the monitoring system 10 from the appliance 12. The monitoring system 10 may also be referred to as a monitoring assembly. As illustrated in FIGS. 1 and 2, the monitoring system 10 is positioned on a rear wall 74 of the appliance 12. It is also contemplated that the monitoring system 10 can be positioned in any location within the appliance 12 to maximize the images and views within the appliance 12. Additionally or alternatively, a plurality of monitoring systems 10 may be coupled within the appliance 12 and communicatively coupled, such that a variety of images are communicated between the monitoring system 10 and, ultimately, to the user.

With further reference to FIGS. 1-3, the monitoring system 10 is communicatively coupled to a controller 76 that receives the images from the data collection device 38. The data collection device 38 may include a variety of devices, such as data sensors, configured to collect various data within the appliance 12. By way of example, not limitation, the data collection device 38 described herein is an imager. The imager 38 is retained within the resilient housing 14, and the resilient housing 14 is operably coupled to the interior surface 68 of the appliance 12. It is generally contemplated that the imager 38 may be a camera or other vision-based device configured to capture image data of an interior 84 of the appliance 12.

Referring to FIGS. 2-5, the imager 38 includes a lens 90 and a curved surface 94 disposed around the lens 90 in which a sensor 96 can be disposed to sense the amount of light present within the appliance 12. The lens 90, the curved surface 94, and the sensor 96 are generally disposed within an angular casing 98, described below. In one instance, it is contemplated that the imager 38 may collect data when the light present in the appliance 12 reaches a particular visible or non-visible illumination level. Alternatively, the imager 38 may be triggered by a motion sensor that detects movement of the door, or a proximity sensor that detects movement within a close range of the proximity sensor. By way of example, not limitation, the consumer typically opens the doors 48, 52 prior to data being collected by the imager 38. The imager 38 can utilize the light generated by the appliance 12 in addition to the natural light that may enter the appliance 12 with the doors 48, 52 open. Once the sensor 96 detects the light, movement of the controller 76 activates the imager 38 to capture an image. The angular casing 98, mentioned above, is movable about an axis to capture a multitude of images of the interior 84 of the appliance 12. It is also contemplated that the angular casing 98 may be fixed in a position, such that the imager 38 is focused on a single section of the appliance 12.

Conventional systems may utilize a rigid structure that adheres to a side of a conventional appliance. As a result of the rigidity of the conventional structure, the conventional systems may be difficult to remove from the conventional appliance. Accordingly, the residue of the adhesives used to bond the conventional system to the side of the conventional appliance may remain on the conventional appliance after attempted removal.

Figure 4:
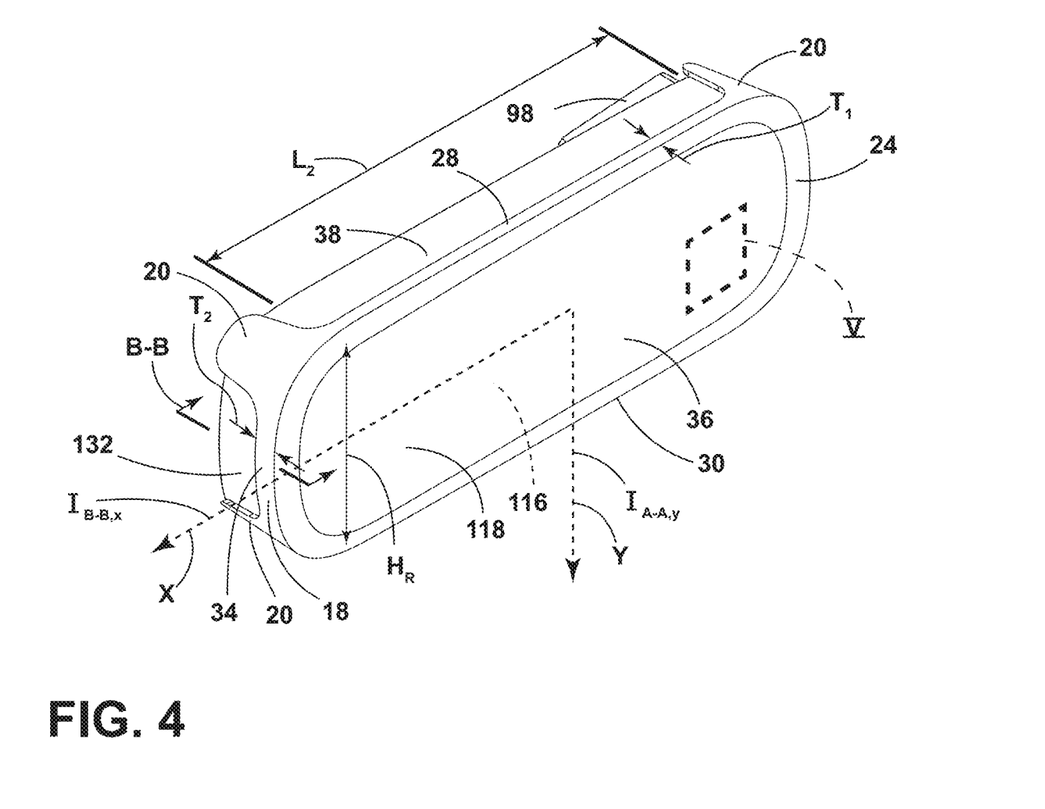
FIG. 4 is a rear top perspective view of a monitoring system with a coupling layer disposed on a rear attachment surface of a resilient housing of the present disclosure.
Figure 5:
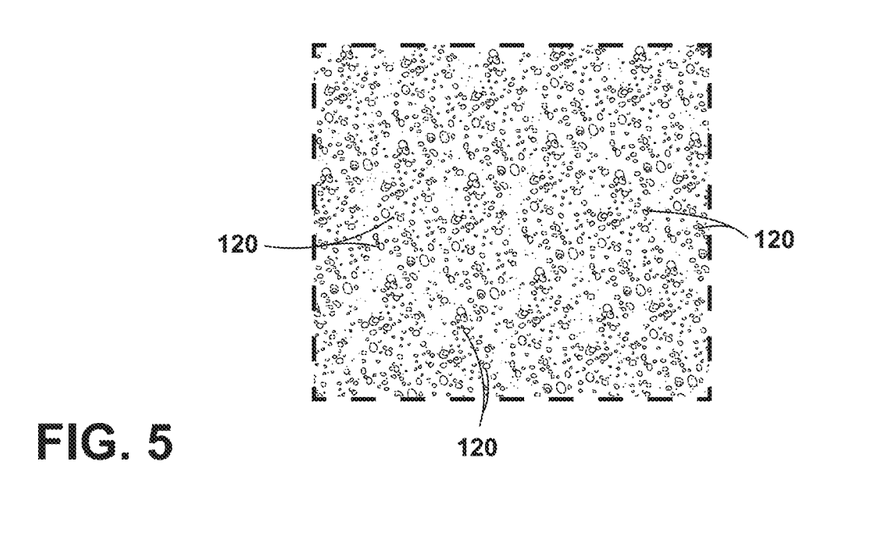
FIG. 5 is an expanded view of the coupling layer of FIG. 4 taken at area V with nano-cavities defined thereon.

With further reference to FIGS. 2-5, the retention features 20 operably couple the imager 38 within the resilient housing 14. As illustrated, the retention features 20 may be referred to as a plurality of retention features 20 and each have a semi-circular construction to generally cradle the imager 38 within the resilient housing 14 against the support surface 26. The retention features 20 as illustrated in FIGS. 3 and 4 include a retention feature 20 at each corner of the resilient housing 14. Stated differently, the first end 16 and the second end 18 of the resilient housing 14 each include a first retention feature 110 and a second retention feature 112. The first and second retention features 110, 112 cooperate to retain the imager 38 within the resilient housing 14 and are described in more detail below.

The support surface 26 of the body 22 abuts a rear surface 114 of the imager 38 to further support the imager 38 within the resilient housing 14. Additionally or alternatively, the support surface 26 of the resilient housing 14 may provide a structural backing to the imager 38, such that the rear surface 114 of the imager 38 may be integral with the support surface 26. It is generally contemplated that to remove the resilient housing 14 from the interior surface 68 of the appliance 12, the imager 38 is first removed from the resilient housing 14 as the imager 38 is typically a rigid body. The rigidity of a body, such as the imager 38, can make removal of the monitoring system 10 more difficult. The resilient housing 14 is formed from a generally pliable material and is contemplated to be generally flexible about a y-axis Y and generally rigid about an x-axis X, described in more detail below.

The resilient housing 14 is selectively coupled to the interior surface 68 of the appliance 12. The coupling layer 36 that is disposed on the rear attachment surface 24 of the resilient housing 14 can be securely, but removably, coupled to the interior surface 68 of the appliance 12. It is generally contemplated that the coupling layer 36 includes first and second surfaces 116, 118, wherein the first surface 116 is coupled to the rear attachment surface 24 of the body 22. Typically, the first surface 116 is a standard adhesive material that securely adheres the coupling layer 36 to the rear attachment surface 24, while the second surface 118 can be a micro-suction adhesive configured to be removable from a mounting surface to which the second surface 118 is coupled. The second surface 118, formed from the micro-suction adhesive, has a plurality of nano-cavities 120 disposed along the second surface 118. Each of the nano-cavities 120 contains air, which is removed from the nano-cavities 120 upon compression of the second surface 118.

With further reference to FIGS. 2-5, the compression of the nano-cavities 120 activates the micro-suction adhesive to seal against, for example, the interior surface 68 of the appliance 12. This adherence defines a partial vacuum between the interior surface 68 and the coupling layer 36 and, as a result, the resilient housing 14. As the air is compressed from each nano-cavity 120, the compressed portions of the second surface 118 of the coupling layer 36 are suctioned to the interior surface 68 of the appliance 12. It is generally contemplated that this coupling layer 36 may be used on a resilient housing 14 of various sizes, such that the level of force applied to evacuate the nano-cavities 120 proportionally increases with the size of the resilient housing 14. Additionally, the amount of pressure exerted against the coupling layer 36 to evacuate the nano-cavities 120 may inform the degree of attachment of the resilient housing 14 to the interior surface 68 of the appliance 12. By way of example, not limitation, the more pressure that is applied to the resilient housing 14, upon coupling the resilient housing 14 to the appliance 12, the stronger the bond between the coupling layer 36 and the appliance 12.

It is also contemplated that the second surface 118 of the coupling layer 36 may include a traditional adhesive generally known in the art. The traditional adhesive may be similar to the standard adhesive material used on the first surface 116 or may be a different traditional adhesive known in the art. The traditional adhesive may fix the resilient housing 14 to the interior surface 68 of the appliance 12. Additionally or alternatively, the traditional adhesive may allow the resilient housing 14 to be selectively removed from and readjusted relative to the interior surface 68. The coupling layer 36 primarily discussed in the present disclosure is one that allows the selective removal of the resilient housing 14 from the interior surface 68 whether using the micro-suction adhesive or the traditional adhesive.

Referring now to FIGS. 3-7, the imager 38 is removably coupled to the support surface 26 via the retention features 20 to aid the removal and/or adjustment of the resilient housing 14. It is generally contemplated that the first and second elongated walls 28, 30 and the first and second end walls 32, 34 of the body 22, in addition to the retention features 20, are configured to support the imager 38 within the resilient housing 14. The first and second elongated walls 28, 30 extend between the first retention features 110 on the first and second ends 16, 18 of the resilient housing 14. The first and second end walls 32, 34 extend between the first and second retention features 110, 112 on each of the first and second ends 16, 18, respectively. Stated differently, the first end wall 32 is defined on the first end 16 of the resilient housing 14, and the second end wall 34 is defined on the second end 18 of the resilient housing 14.

Figure 7:
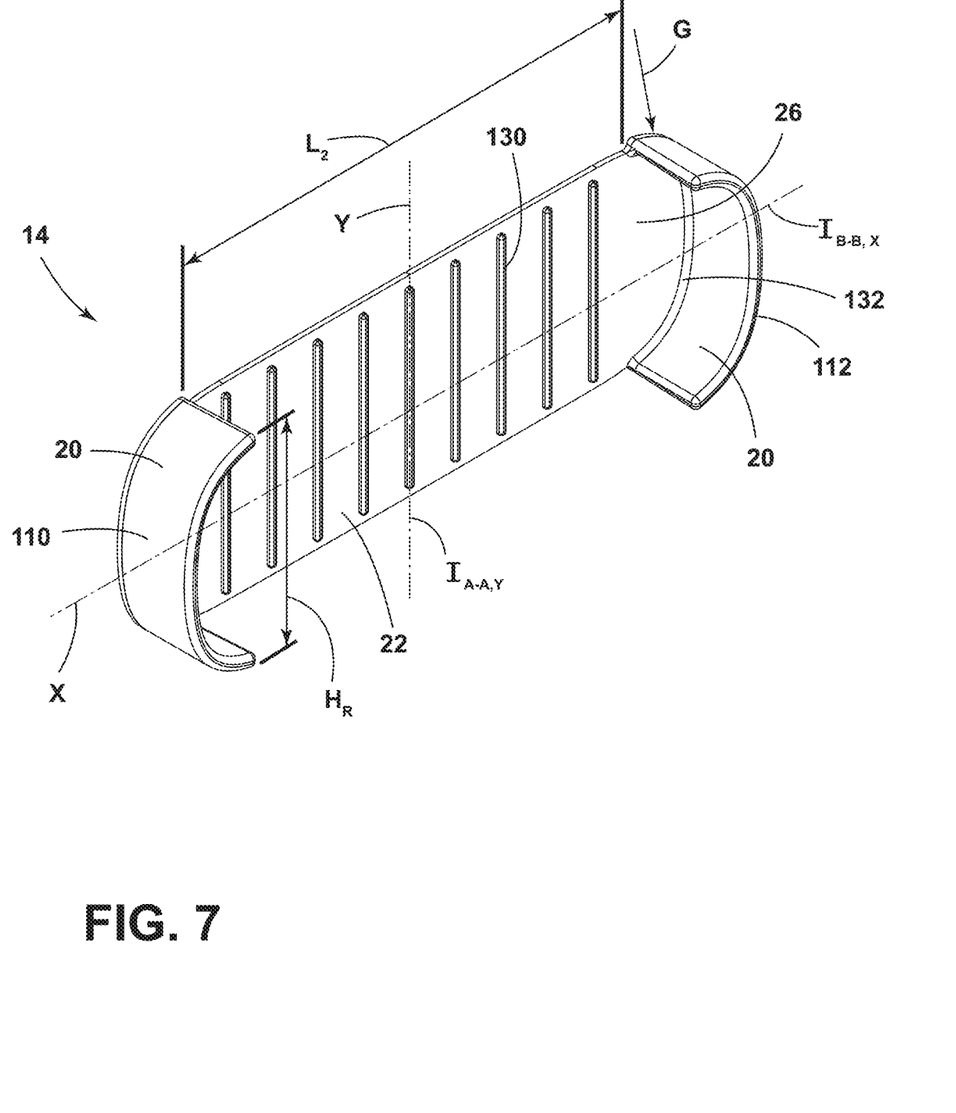
FIG. 7 is a top perspective view of a resilient housing of the present disclosure.
Figure 8:
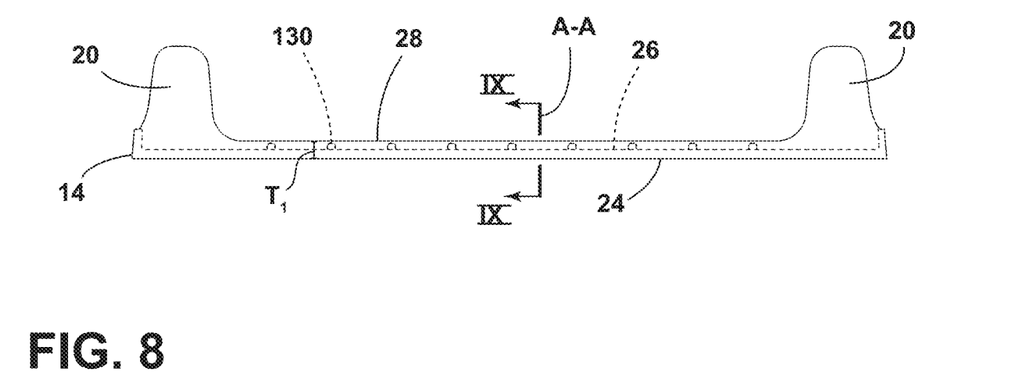
FIG. 8 is a top elevational view of a resilient housing of the present disclosure.
Figure 9:
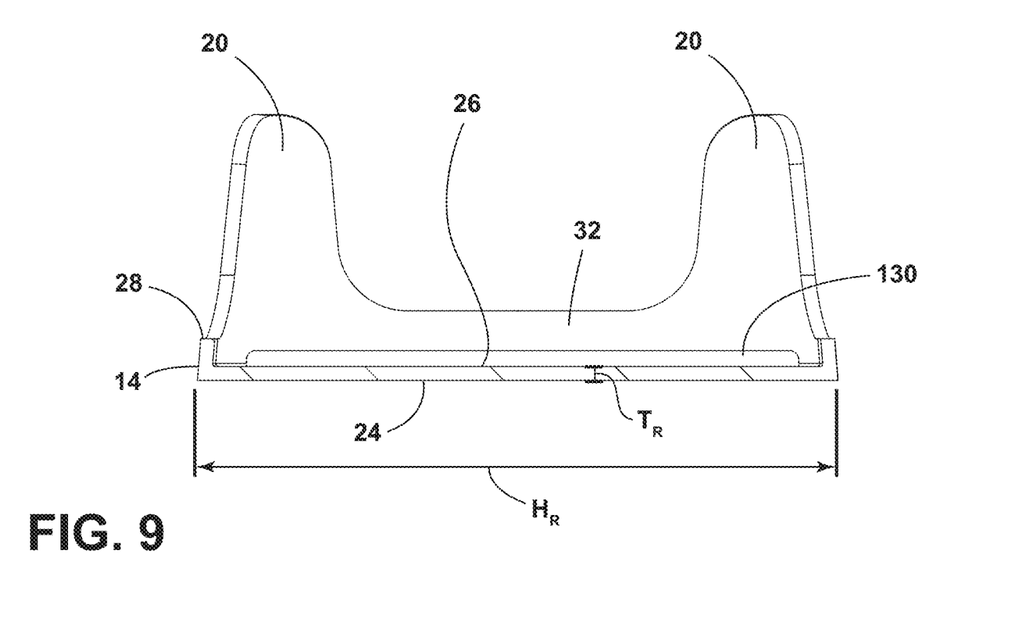
FIG. 9 is an enlarged cross-sectional view of the resilient housing of FIG. 8 taken at line IX-IX.

Additionally or alternatively, the first retention feature 110 and the second retention feature 112 illustrated in FIG. 7 are disposed on the first end 16 and the second end 18, respectively. It is further contemplated that the retention features 20 may be configured to be inserted into the imager 38. By way of example, not limitation, the retention features 20 may be posts that extend through the imager 38 so the resilient housing 14 defines a backing of the imager 38. In any one of the above constructions, the imager 38 is removably coupled to the resilient housing 14 via the retention features 20.

It is generally contemplated that the elongated walls 28, 30 have a thickness $T_1$ and the end walls 32, 34 have a thickness $T_2$. As illustrated in FIG. 3, the thickness $T_2$ of the end walls 32, 34 is greater than the thickness $T_1$ of the elongated walls 28, 30. It is contemplated that the thickness $T_2$ of the end walls 32, 34 provide the body 22 with additional structural support to retain the imager 38 on the support surface 26. The lesser thickness $T_1$ of the elongated walls 28, 30, in relation to the greater thickness $T_2$ of the end walls 32, 34, maintains the overall resiliency and flexibility of the resilient housing 14. The thickness $T_2$ can help minimize rotation of the resilient housing 14 about the x-axis X, while the thickness $T_1$ of the elongated walls 28, 30 promotes the flexibility of the resilient housing 14 about the y-axis Y.

With further reference to FIGS. 3-7, the assembled monitoring system 10 may have an increased weight as compared to the resilient housing 14 alone due to the weight of the imager 38, which increases the load $L_1$ placed upon the coupling layer 36. Specifically, gravitational force G will result in a peel-force $P_x$ acting upon the resilient housing 14, which will affect the adherence of the monitoring system 10 to the interior surface 68 of the appliance 12. To combat the gravitational force G, the resilient housing 14 is highly resistant to the peel-force $P_x$ about the x-axis X, which minimizes the potential of peeling from the interior surface 68 (FIG. 2) under gravitational force G. To further minimize the effects of the gravitational force G about the x-axis X of the resilient housing 14, the body 22 of the resilient housing 14 may be additionally braced with reinforcement ribs 130 disposed along a length $L_2$ of the body 22. In addition to the first and second end walls 32, 34, the reinforcement ribs 130 increase the general rigidity of the body 22 of the resilient housing 14. The body 22 is less likely to bend about the x-axis X as a result of the increased rigidity with the reinforcement ribs 130. The reinforcement ribs 130 extend perpendicular to the x-axis X of the body 22 to resist peeling about the x-axis X. In general, the x-axis X may be defined as extending between a central location 132 of the first and second end walls 32, 34 of the resilient housing 14.

As the reinforcement ribs 130 are perpendicular to the x-axis X, the reinforcement ribs 130 are accordingly parallel along the y-axis Y to allow bending and flexing of the resilient housing 14 relative to the y-axis Y. The y-axis Y is defined parallel to the first and second end walls 32, 34 of the body 22 and the reinforcement ribs 130. When bending the resilient housing 14 about the y-axis Y, the imager 38 is first removed from the resilient housing 14. Although the resilient housing 14 has a greater ability to bend, flex, and be removed along the y-axis Y, the insertion of the imager 38 within the retention features 20 of the resilient housing 14 minimizes the potential of bending and removal of the monitoring system 10 from the interior surface 68 of the appliance 12.

Figure 6:
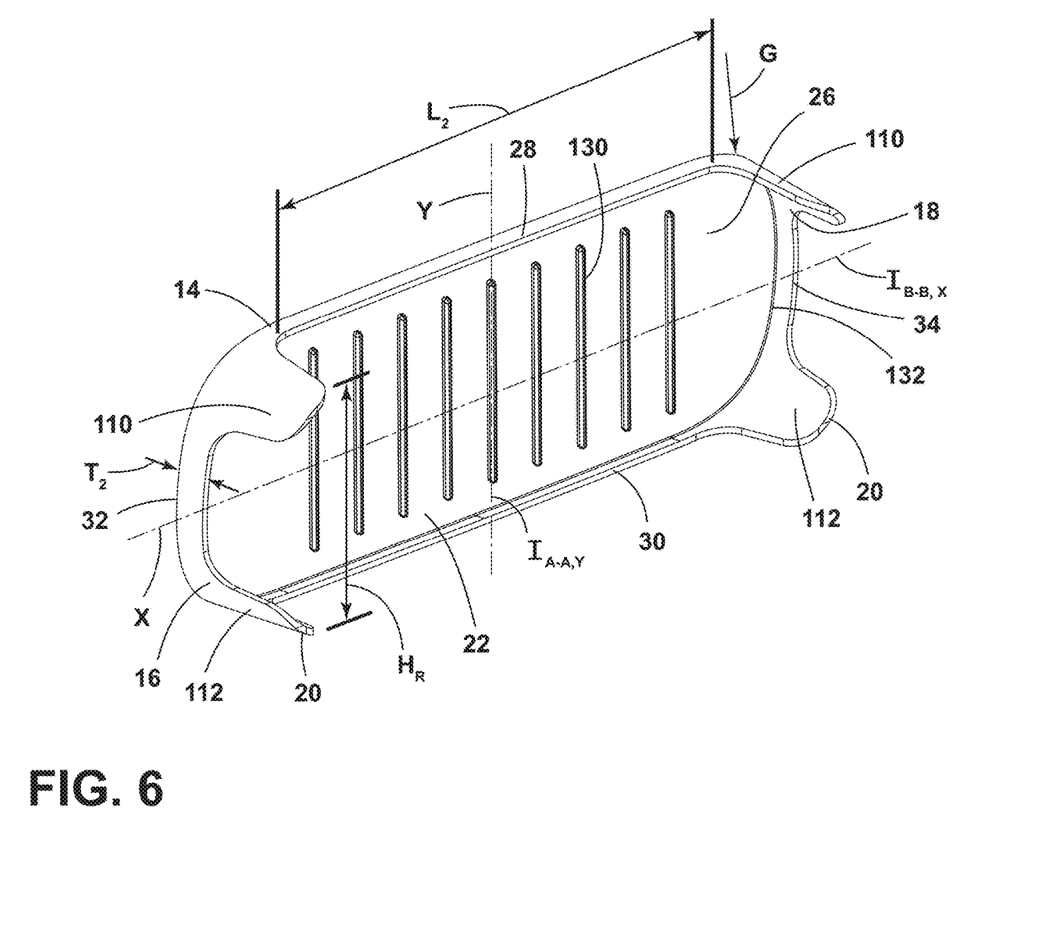
FIG. 6 is a top perspective view of a resilient housing of the present disclosure.

Referring now to FIG. 7, an additional aspect of the resilient housing 14 is illustrated as having the first retention feature 110 on the first end 16 of the resilient housing 14, and the second retention feature 112 on the second end 18. In the depicted aspect, the first and second retention features 110, 112 have a generally semi-circular cross-section configured to cradle the imager 38. The body 22 of the resilient housing 14 is free from both the elongated walls 28, 30 and the end walls 32, 34 as the first and second retention features 110, 112 provide sufficient structural rigidity for the resilient housing 14 about the x-axis X. Stated differently, it is generally contemplated that the first and second retention features 110, 112 can generally replace the first and second end walls 32, 34 of the aspect depicted in FIG. 6. It is generally contemplated that the first and second retention features 110, 112, as illustrated in FIG. 7, may increase the rigidity of the resilient housing 14 to the extent that the body 22 of the resilient housing 14 can be free from the first and second elongated walls 28, 30. For example, the first and second retention features 110, 112 in FIG. 7 extend along a greater portion of the body 22 as compared to the retention features 20 in FIG. 6. For purposes of this disclosure, the aspect illustrated in FIG. 6 is described herein. However, it is also contemplated that the description described below also applies to the aspect as described with relation to FIG. 7.

Referring now to FIGS. 2 and 6-9, the peel-force $P_y$ about the y-axis Y is typically much lower than the peel-force $P_x$ about the x-axis X as a result of the overall height $H_R$ and thickness $T_R$ of the resilient housing 14. As described in further detail below, the resilient housing 14 has a small cross-sectional area moment of inertia $I_{A-A,y}$ relative to the y-axis Y, such that the resistance to peeling about the y-axis Y is less than the resistance to peeling about the x-axis X. In addition to the moment of inertia $I_{A-A,y}$ relative to the y-axis Y, the resilient housing 14 also has a cross-sectional area moment of inertia $I_{B-B,x}$ relative to the x-axis X, which for purposes of this disclosure is greater than the moment of inertia $I_{A-A,y}$ about the y-axis Y.

The moments of inertia $I_{A-A,y}$, $I_{B-B,x}$ are generally defined as a measure of the resilient housing's 14 resistance to rotation, such as peeling or bending, about the y-axis Y and the x-axis X, respectively. As a result of the smaller moment of inertia $I_{A-A,y}$ relative to the y-axis Y, the user can easily peel and remove the resilient housing 14 from the interior surface 68 of the appliance 12 about the y-axis Y. Due to the relatively low resistance to peeling about the y-axis Y, the second surface 118 of the coupling layer 36 easily releases from the interior surface 68 of the appliance 12, and the interior surface 68 is free from the residue after the removal of the resilient housing 14. As mentioned above, the bending of the resilient housing 14 about the y-axis Y is defined by the cross-sectional moment of inertia $I_{A-A,y}$ taken at point A-A. The cross-sectional moment of inertia $I_{A-A,y}$ relative to the y-axis Y of the resilient housing 14 is calculated as $I_{A-A,y} = \int z^2 \, dA$. Similarly, the cross-sectional moment of inertia $I_{B-B,x}$ relative to the x-axis X of the resilient housing 14 is calculated as $I_{B-B,x} = \int z^2 \, dA$, discussed in further detail below. The moments of inertia $I_{A-A,y}$, $I_{B-B,x}$ are based upon the integral of a distance z squared from the y-axis Y or the x-axis X, respectively, and multiplied by the differential area dA.

With further reference to FIGS. 2 and 6-9, the moment of inertia $I_{A-A,y}$ relative to the y-axis Y is proportional to the height $H_R$ of the resilient housing 14 and is also proportional to the thickness $T_R$ of the resilient housing 14 cubed. In order to determine the specific moment of inertia $I_{A-A,y}$ relative the y-axis Y, the equation $I_{A-A,y} = \int z^2 \, dA$ is localized to the cross-sectional point A-A taken about the y-axis Y. In addition, the height $H_R$ of the resilient housing 14 is determined to maximize the amount of the coupling layer 36 that will securely, but removably, couple the monitoring system 10 to the interior surface 68 of the appliance 12. In addition, the thickness $T_R$ of the body 22 is determined relative to the height $H_R$ of the resilient housing 14 to maintain the flexibility of the resilient housing 14 so the coupling layer 36 can be easily removed from the interior surface 68 of the appliance 12.

In general, the smaller the thickness $T_R$ of the body 22, the lower the moment of inertia $I_{A-A,y}$, which leads to a more flexible resilient housing 14 about the y-axis Y to enable easier peeling of the coupling layer 36 from the mounting surface, such as the interior surface 68. Accordingly, the greater the thickness $T_R$ the more difficult and the more rigid the resilient housing 14. Thus, although the resilient housing 14 may take various shapes and constructions, it is generally desirable that the thickness $T_R$ of the resilient housing 14 is minimal relative to the height $H_R$ of the resilient housing 14 to maintain the flexibility of the resilient housing 14 about the y-axis Y. For example, the first and second elongated walls 28, 30 have a thickness $T_1$ that is less than a thickness $T_2$ of the first and second end walls 32, 34 to maximize the flexibility of the resilient housing 14. The moment of inertia $I_{A-A,y}$ about the y-axis Y is typically a measure of the efficiency of the cross-sectional shape of the resilient housing 14 to resist bending. As the resilient housing 14 is configured to bend and flex about the y-axis Y, the moment of inertia $I_{A-AN}$ is relatively small. Thus, the thickness $T_R$ of the resilient housing 14 is proportionally small, such that the thinner the resilient housing 14 the smaller the moment of inertia $I_{A-A,y}$.

Comparatively, the moment of inertia $I_{B-B,x}$ of a cross-sectional point B-B of the resilient housing 14 relative to the x-axis X is affected by, but not necessarily proportional to, the length $L_2$ of the resilient housing 14, the thickness $T_R$ of the resilient housing 14 cubed, and the thickness $T_2$ of the first and second end walls 32, 34. Rather than the small moment of inertia $I_{A-A,y}$ as relative to the y-axis Y, the moment of inertia $I_{B-B,x}$ about the x-axis X is generally larger than the moment of inertia $I_{A-A,y}$ about the y-axis Y of the resilient housing 14. In general, it is desirable to have the largest possible moment of inertia $I_{B-B,x}$ relative the x-axis X to resist bending and flexion. The length $L_2$ of the resilient housing 14 is generally determined to maximize the amount of the coupling layer 36 attached to the rear attachment surface 24 of the resilient housing 14 while maintaining a large moment of inertia $I_{B-B,x}$ about the x-axis X. In addition, the thickness $T_R$ of the resilient housing 14 is determined to maximize the bending about the y-axis Y of the resilient housing 14 and minimize bending about the x-axis X for purposes of selectively coupling the resilient housing 14 to the appliance 12.

Referring still to FIGS. 2 and 6-9, in order to maximize the moment of inertia $I_{B-B,x}$ about the x-axis X, the dimensions of the first and second end walls 32, 34 can be altered to increase the moment of inertia $I_{B-B,x}$ relative the x-axis X. As a result, the resilient housing 14 may resist bending about the x-axis X that may otherwise occur as a result of the gravitational force G acting upon the monitoring system 10. In general, increasing a height of the retention features 20 and the first and second end walls 32, 34 may greatly increase on the moment of inertia $I_{B-B,x}$ about the x-axis X, such that the resilient housing 14 may resist bending about the x-axis X to a greater degree when the retention features 20 have a larger height. The reinforcement ribs 130 may be added to further increase the moment of inertia $I_{B-B,x}$, and consequently decrease bending about the x-axis X. As mentioned above, the reinforcement ribs 130 are disposed about the y-axis Y and, accordingly, provide further resistance to bending relative the x-axis X for the resilient housing 14 while flexion of the resilient housing 14 relative the y-axis Y is generally uninhibited.

Referring again to FIGS. 1-9 and as generally discussed above, users typically repeatedly open and close the doors 48, 52 of the appliance 12 to determine what items may need to be replenished. In an effort to improve user experience and efficiency of replenishing items, the monitoring system 10 may communicate with the user's portable computing device and/or other programmable software devices that may communicate with the monitoring system 10. Based on the shared information, the monitoring system 10 may update the user on the current status of items within the appliance 12. Accordingly, the user may receive current information on the items within the appliance 12 to inform the user during a process, such as shopping or ordering of items. In addition, the monitoring system 10 may communicate with the controller and the user's portable computing device to deliver recipe options based on the data collected by the monitoring system 10. To execute such functions, it is generally contemplated that the monitoring system 10 may be communicatively coupled to the controller that is connected to a network to send the information to the user's portable computing device or other software device.

In addition to such informative advantages, the relatively small moment of inertia relative the y-axis Y provides that the coupling layer 36 may be easily removed from the interior surface 68 of the appliance 12 while the interior surface 68 is free from residue after the removal of the resilient housing 14 from the appliance 12. Thus, the user may remove and replace the monitoring system 10 in various locations within the appliance 12 without excessive cleaning or abrasive measures to remove residue of the coupling layer 36 that may otherwise be on the interior surface 68 of the appliance 12 after the removal of the resilient housing 14. This decrease in residue is a result of the small moment of inertia $I_{A-A,y}$ about the y-axis Y of the resilient housing 14 as compared to the greater moment of inertia $I_{B-B,x}$ about the x-axis X.

The invention disclosed herein is further summarized in the following paragraphs and is further characterized by combinations of any and all of the various aspects described therein.

According to one aspect of the present disclosure, a monitoring system for an appliance includes a resilient housing that has a first end and a second end. The resilient housing includes retention features, and a body that has a rear attachment surface and a support surface. The body also includes first and second elongated walls and first and second end walls that cooperate to define the support surface. The resilient housing further includes a coupling layer that is disposed on the rear attachment surface of the body, and a data collection device that is disposed on the support surface of the body and is operably coupled to the resilient housing via the retention features.

According to another aspect, a data collection device is an imager that is configured to collect image data of an interior of said appliance.

According to another aspect, a resilient housing further includes a plurality of reinforcement ribs that are disposed along a support surface of a body.

According to another aspect, retention features include a first retention feature and a second retention feature.

According to another aspect, first and second retention features are disposed on both a first end and a second end of a resilient housing.

According to another aspect, a first retention feature is disposed on a first end of a resilient housing, and a second retention feature is disposed on a second end of the resilient housing.

According to another aspect, a body is configured to bend about a y-axis that is defined parallel to first and second retention features.

According to another aspect, a resilient housing has a y-axis cross-sectional moment of inertia that is defined as $I_{A-A,y}=\int z^2 \, dA$ and an x-axis cross-sectional moment of inertia that is defined as $I_{B-B,x}=\int z^2 \, dA$.

According to another aspect of the present disclosure, a monitoring assembly for an appliance includes a resilient housing including a plurality of retention features and a body that extend between the plurality of retention features. The body has a rear attachment surface and a support surface that is defined between the plurality of retention features. A data collection device is disposed on the support surface of the body and is operably coupled to the body of the resilient housing via the plurality of retention features. A coupling layer is disposed on the rear attachment surface of the body.

According to another aspect, a resilient housing includes a first end and a second end. A plurality of retention features are disposed on the first and second ends of the resilient housing.

According to another aspect, a body of a resilient housing includes a first end wall and a second end wall. The first end wall is disposed on a first end of the resilient housing between a first retention feature and a second retention feature.

According to another a plurality of retention features includes a first retention feature and a second retention feature. The first retention feature is disposed on a first end of a resilient housing and the second retention feature is disposed on a second end of the resilient housing.

According to another aspect, a body includes a first elongated wall and a second elongated wall.

According to another aspect, a resilient housing has a y-axis cross-sectional moment of inertia that is defined as $I_{A-A,y}=\int z^2 \, dA$ and an x-axis cross-sectional moment of inertia that is defined as $I_{B-B,x}=\int z^2 \, dA$.

According to yet another aspect of the present disclosure, a resilient housing for a monitoring system includes a plurality of retention features, and a body that has a first end and a second end and extends between the plurality of retention features. The body includes a support surface that is defined between the plurality of retention features by elongated walls and end walls and a rear attachment surface. A resilient housing for a monitoring system further includes a coupling layer that is disposed on the rear attachment surface of the body.

According to another aspect, a coupling layer includes a micro-suction adhesive that has a plurality of nano-cavities.

According to another aspect, a plurality of retention features and end walls of a body are configured to resist bending of the body about an x-axis that is defined perpendicular to the end walls.

According to another aspect, a body is configured to bend about a y-axis that is defined parallel to end walls of the body.

According to another aspect, end walls of a body have a thickness that is greater than a thickness of elongated walls of the body.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A monitoring system for an appliance, comprising:
a resilient housing having a first end and a second end, the resilient housing comprising:
  retention features;
  a body having a rear attachment surface and a support surface, the body also including first and second elongated walls and first and second end walls that cooperate to define the support surface, wherein the body bends during coupling and removal of the resilient housing with an interior of said appliance; and
  a coupling layer disposed on the rear attachment surface of the body; and
a data collection device disposed on the support surface of the body, communicatively coupled with a controller, and operably coupled to the resilient housing via the retention features.

2. The monitoring system of claim 1, wherein the data collection device is an imager that collects a plurality of image data of the interior of said appliance.

3. The monitoring system of claim 1, wherein the resilient housing further includes a plurality of reinforcement ribs disposed along the support surface of the body.

4. The monitoring system of claim 1, wherein the retention features include a first retention feature and a second retention feature.

5. The monitoring system of claim 4, wherein the first and second retention features are disposed on both the first end and the second end of the resilient housing.

6. The monitoring system of claim 4, wherein the first retention feature is disposed on the first end of the resilient housing and the second retention feature is disposed on the second end of the resilient housing.

7. The monitoring system of claim 1, wherein the body is configured to bend about a y-axis defined parallel to the first and second ends of the resilient housing.

8. The monitoring system of claim 1, wherein the resilient housing has a y-axis cross-sectional moment of inertia defined as $I_{A-A,y}=\int z^2\, dA$ and an x-axis cross-sectional moment of inertia defined as $I_{B-B,x}=\int z^2\, dA$, and wherein $I_{A-A,y}$ is less than $I_{B-B,x}$.

9. A monitoring assembly comprising:
an appliance;
a resilient housing including a plurality of retention features and a body extending between the plurality of retention features, the body having a rear attachment surface and a support surface defined between the plurality of retention features, wherein the body bends concavely during coupling and removal of the resilient housing with the appliance;
a data collection device disposed on the support surface of the body and operably coupled to the body of the resilient housing via the plurality of retention features, wherein the data collection device includes an imager that collects a plurality of image data of an interior of the appliance at a plurality of angles; and
a coupling layer disposed on the rear attachment surface of the body.

10. The monitoring assembly of claim 9, wherein the resilient housing includes a first end and a second end, and wherein the plurality of retention features are disposed on the first and second ends of the resilient housing.

11. The monitoring assembly of claim 10, wherein the body of the resilient housing includes a first end wall and a second end wall, and wherein the first end wall is disposed on the first end of the resilient housing between a first retention feature and a second retention feature.

12. The monitoring assembly of claim 10, wherein the plurality of retention features includes a first retention feature and a second retention feature, and wherein the first retention feature is disposed on the first end of the resilient housing and the second retention feature is disposed on the second end of the resilient housing.

13. The monitoring assembly of claim 9, wherein the body includes a first elongated wall and a second elongated wall.

14. The monitoring assembly of claim 9, wherein the resilient housing has a y-axis cross-sectional moment of inertia defined as $I_{A-A,y}=\int z^2\, dA$ and an x-axis cross-sectional moment of inertia defined as $I_{B-B,x}=\int z^2\, dA$, wherein $I_{A-A,y}$ is less than $I_{B-B,x}$.

15. A resilient housing for a monitoring system, comprising:
a plurality of retention features;
a body extending between the plurality of retention features and having a first end and a second end, the body including:
  a support surface defined between the plurality of retention features by elongated walls and end walls; and
  a rear attachment surface; and
a coupling layer disposed on the rear attachment surface of the body, wherein the coupling layer includes a micro-suction adhesive having a plurality of nano-cavities, and wherein said resilient housing couples with an interior surface of an appliance when partial vacuums are defined within the plurality of nano-cavities when said resilient housing straightens between the first end and the second end from a concave position to a straightened position.

16. The resilient housing of claim 15, further comprising:
a plurality of reinforcement ribs disposed along a length of the support surface.

17. The resilient housing of claim 15, wherein the plurality of retention features and the end walls of the body are configured to resist bending of the body about an x-axis that is defined perpendicular to the end walls.

18. The resilient housing of claim 15, wherein the body is configured to bend about a y-axis defined parallel to the end walls of the body.

19. The resilient housing of claim 15, wherein the end walls of the body have a thickness that is greater than a thickness of the elongated walls of the body.

* * * * *